United States Patent [19]
Hollander et al.

[11] Patent Number: 5,111,957
[45] Date of Patent: May 12, 1992

[54] METHOD AND APPARATUS FOR PACKAGING REFRIGERATED GOODS

[75] Inventors: David S. Hollander, Brooklyn, N.Y.; Mark S. Rubenstein, Edison, N.J.

[73] Assignee: Transtech Service Network, Inc., Rosedale, N.Y.

[21] Appl. No.: 467,678

[22] Filed: Jan. 19, 1990

Related U.S. Application Data

[63] Continuation-in-part of Ser. No. 203,943, Jun. 2, 1988, Pat. No. 4,928,847.

[51] Int. Cl.⁵ .............................................. B65D 5/56
[52] U.S. Cl. .................................. 220/408; 220/410; 220/441; 220/450; 229/3.5 MF
[58] Field of Search ............... 220/408, 410, 441, 450, 220/452, 467, 468, 902; 206/545; 229/35 R, 3.5 MF, DIG. 4

[56] References Cited

U.S. PATENT DOCUMENTS

| | | | |
|---|---|---|---|
| 1,194,313 | 3/1880 | Downing . | |
| 2,031,254 | 2/1936 | Derr | 220/450 |
| 2,149,412 | 3/1939 | Bangs | 220/441 |
| 2,181,074 | 11/1939 | Scott | 220/452 |
| 2,496,296 | 2/1950 | Lobl | 206/545 |
| 2,794,588 | 6/1957 | George et al. . | |
| 2,833,044 | 5/1958 | Johnson et al. . | |
| 2,979,447 | 7/1959 | Winer . | |
| 3,024,939 | 3/1962 | Kantor | 220/468 |
| 3,142,406 | 7/1964 | Kantor | 220/468 |
| 3,162,566 | 12/1964 | Katz | 220/452 |
| 3,236,206 | 2/1966 | Willinger | 220/441 |
| 3,341,102 | 9/1967 | Stevens et al. | 229/3.5 MF |
| 3,391,056 | 7/1968 | Robinson, Jr. . | |
| 3,445,052 | 5/1969 | Lewallen | 220/450 |
| 3,642,550 | 2/1972 | Doll | 229/3.5 R |
| 3,746,593 | 7/1973 | Majewski et al. | 229/DIG. 4 |
| 3,866,523 | 2/1975 | Geschwender | 493/19 |
| 3,890,762 | 6/1975 | Ernst | 220/441 |
| 4,084,366 | 4/1978 | Saylor et al. . | |
| 4,166,567 | 9/1979 | Beach, Jr. et al. . | |
| 4,384,106 | 5/1983 | Royster . | |
| 4,434,890 | 3/1984 | Sieck et al. | 229/3.5 MF |
| 4,461,796 | 7/1984 | Fukihori et al. . | |
| 4,465,725 | 8/1984 | Riel . | |
| 4,682,708 | 7/1987 | Pool | 220/468 |
| 4,691,851 | 9/1987 | Snyder . | |
| 4,730,748 | 3/1988 | Bane | 220/450 |
| 4,928,847 | 5/1990 | Hollander et al. | 220/441 |

OTHER PUBLICATIONS

The Wiley Encyclopedia of Packaging Tech. by John Wiley & Sons, 1986, pp. 66 to 67.
"Distribution Packaging" by Friedman and Kipnees Pub. 1977.

*Primary Examiner*—Gary E. Elkins
*Attorney, Agent, or Firm*—Kane, Dalsimer, Sullivan, Kurucz, Levey, Eisele and Richard

[57] ABSTRACT

A chill box for shipping refrigereated goods formed of a plurality of insulating portions which are collapsible and have foiled surface and honeycomb material inbetween. 45 degree chamfers on each of the adjoining sides of each of the corners that are located between the panels of the portions to facilitate bending.

11 Claims, 4 Drawing Sheets

METHOD AND APPARATUS FOR PACKAGING REFRIGERATED GOODS

FIELD OF THE INVENTION

The present application is a continuation in part of U.S. patent application Ser. No. 203,943 filed on Jun. 2, 1988 (and for which the Notice of Allowance was paid on Nov. 27, 1989) and claims priority under 35 USC 120 thereof.

In addition, to the above and noted patent application Ser. No. 203,943 applicants of the present application are also the co-applicants of Ser. No. 266,017 filed on Mar. 2, 1988 and of Ser. No. 430,183 filed on Nov. 1, 1989 (CIP of Ser. No. 266,017).

The present invention relates to a new and improved method and apparatus for packaging goods such as fish which need to be refrigerated and which is subject to spoilage. In particular, the invention relates to a novel method and apparatus for foil laminated honeycomb material packages for packaging perishable goods and other temperature sensitive products.

BACKGROUND OF THE INVENTION

Over the last decade there has been dramatically increased growth and interest in the movement of edible perishables by air, not only in the U.S. but worldwide. The World Air Cargo Industry flew an estimated 6 billion pounds of seafood and 19 billion pounds of produce in 1985. Distant access to fresh products for health, taste, and off-season supply are driving forces in the current import/export growth in many countries and will fuel even greater growth of the future.

Fresh edibles marketing has matured more rapidly than the specialized transport structure needed to provide distribution high product quality control. Specialized packaging is either non-existent or woefully inadequate. This unsatisfactory environment creates waste, disenchantment and/or health and it works toward destroying markets.

The University of California at Davis estimates that 25% of the world's produce is never eaten, because of inefficient transportation systems between the source and the consumer that results in total loss.

Conventional means for packaging goods subject to spoilage such as fish includes packaging the goods in a bag, surrounding the goods with a refrigerant such as Gel-Pack which is then placed in a box with polystyrene insulation walls in order to retard the refrigerant from melting. The box is typically a corrugated type carton. One problem with this type of packaging is that the only insulation for the refrigerant is the polystyrene. Another problem is that the insulation boxes must be shipped inside the corrugated carton boxes and this takes up a considerable amount of space on the pallets. It is therefore preferable to be able to provide collapsible insulation boxes so that more of them can be stored on the pallets. In addition, the corrugated boxes can be shipped in their flat, unassembled form as well, thereby reducing shipping and storage costs significantly.

It is therefore desirable to provide a highly insulative packaging structure which is light weight, less costly for storage and shipping purposes, and which is reusable for further shipping.

SUMMARY OF THE INVENTION

Hence with the foregoing in mind, it is a principle object of the present invention to provide an apparatus for packaging refrigerated goods in strong insulated containers.

It is a further object of the invention to provide a method for manufacturing such containers.

It is still another object of the invention to provide an effective insulating means for preserving goods in a refrigerated state, which are easy to assemble, lightweight, and can be shipped flat and unassembled for transportation purposes, and which permits the corrugated cartons to be similarly shipped.

In order to implement these and other objects of the invention, which will become more readily apparent as the description proceeds, the present invention provides a method and an apparatus for packaging refrigerated goods wherein the packaging structure is formed of collapsible, insulating surfaces having 45 degree chamfer on adjoining sides of indented corners to facilitate folding. Further, the packaging is preferably formed of three portions, each portion having an aluminum foil on its outer surfaces and a honeycomb type material disposed therebetween. The 45 degree chamfer for the corner fold permits each panel of each portion to unfold as part of the assembled package structure.

The present invention utilizes the inherent properties of aluminum foil.

The surface of aluminum foil has the ability not to absorb, but reflect up to 95% of the infrared rays which strike it. Very little heat conduction can take place when only 5% of the rays are absorbed. Therefore, as defined above, foil has low emissivity. Simply put, a foil surface will act as the most effective physical barrier to prevent heat transfer.

An air space can have a tremendous value as thermal insulation. The use of 2 foil surfaces (LOW EMISSIVITY) with an airspace in between will greatly modify the total heat transferred across the space between the foil surfaces, which is why walls and roofs are built with internal air spaces to retard that flow by conduction, and astronauts wear suits of reflective foil surrounding trapped air.

Reflection and emissivity by surfaces can only occur in unobstructed space. The ideal space is any dimension ¾" or more. Where there is no air space as all, conduction through solids occurs; i.e., attache foil to a solid object such as a wall, and the foil will have no reflective insulation value at the point of contact. Temperature can be controlled more effectively by taking advantage of both the low thermal emissivity of foil and the low thermal conductivity of air.

Alternatively, other insulating material can be used instead of honeycomb material such as corrugated material or fluted material. The fluted material can have either an A flute form, a B flute form, a C flute form or an E flute form.

The packaging is preferably formed of panels each having low emissivity, highly reflective grade aluminum foil on its outer surfaces laminated to kraft paper. The foil laminate is then adhered to an additional kraft bonded perpendicular to the honeycomb type material sandwiched between the layers of kraft paper and aluminum foil. The kraft paper helps bond the aluminum foil to the outer surfaces of the kraft perpendicular to the honeycomb material.

BRIEF DESCRIPTION OF THE DRAWINGS

For a full understanding of the nature in the objects of the invention, referenced should be had to the fol

DETAILED DESCRIPTION OF THE PREFERRED EMBODIMENT

Figure 1:
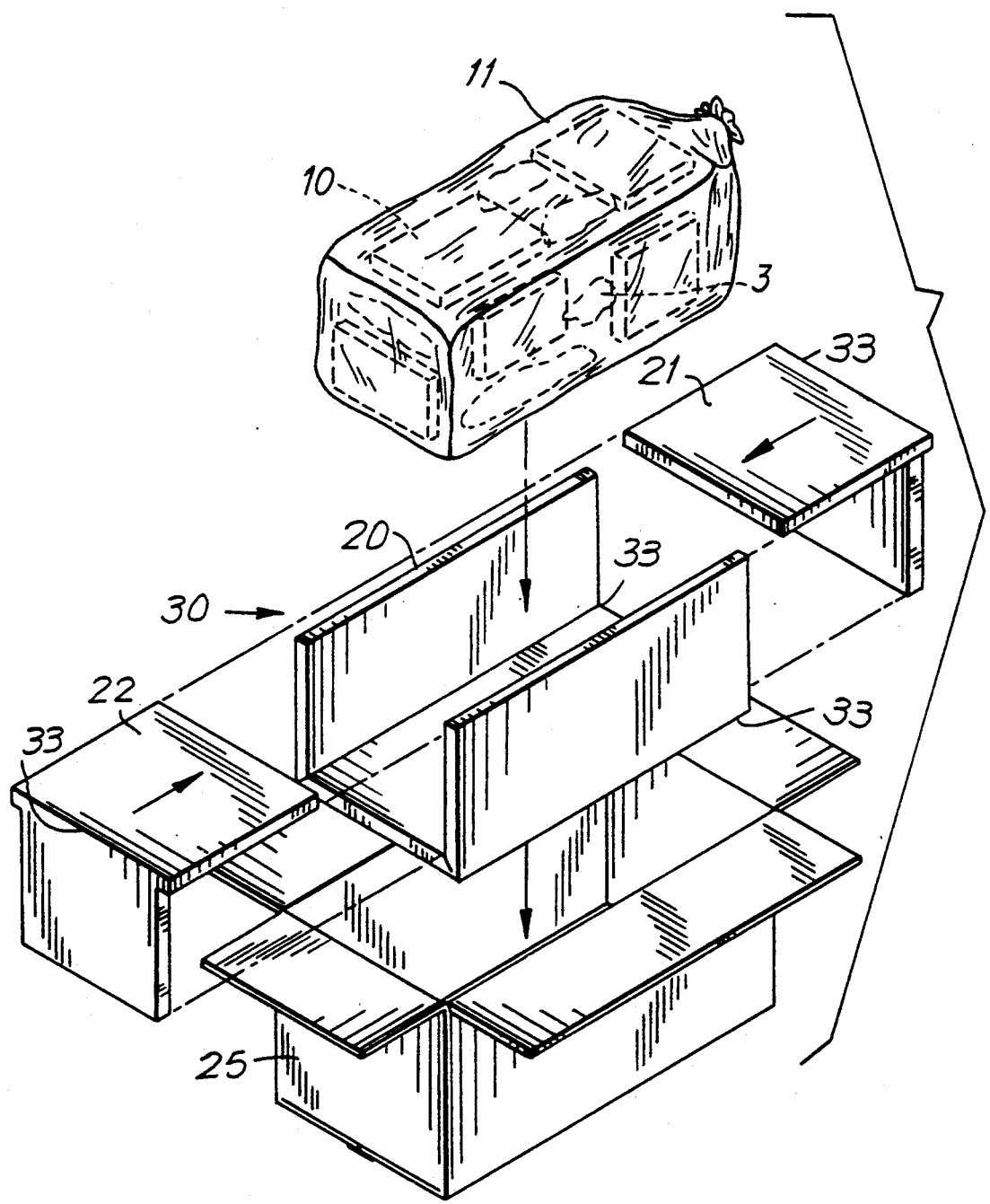
- FIG. 1 is exploded perspective view in accordance with the teachings of the present invention.

Referring now to FIG. 1 of the drawings, the assembly 1 is shown in an exploded perspective view. Perishable goods, such as fish 3, are wrapped together with a blanket or bags of frozen refrigerant such as a Gel-Pack bag 10 and then placed in to the polyethylene bag 11. Bag 11 is a 3 mil plastic bag which is then placed inside the invention - chill box 30, which is formed of 3 portions: a main longitudinal portion 20 and two end portions 21 and 22. The chill box 30 is inserted into a corrugated RSC container 25. As can be seen in FIG. 1, each of the three portions 20, 21 and 22 are formed as a design as closable insulation portions which can be assembled snugly together to form a chill box 30.

Figure 2:
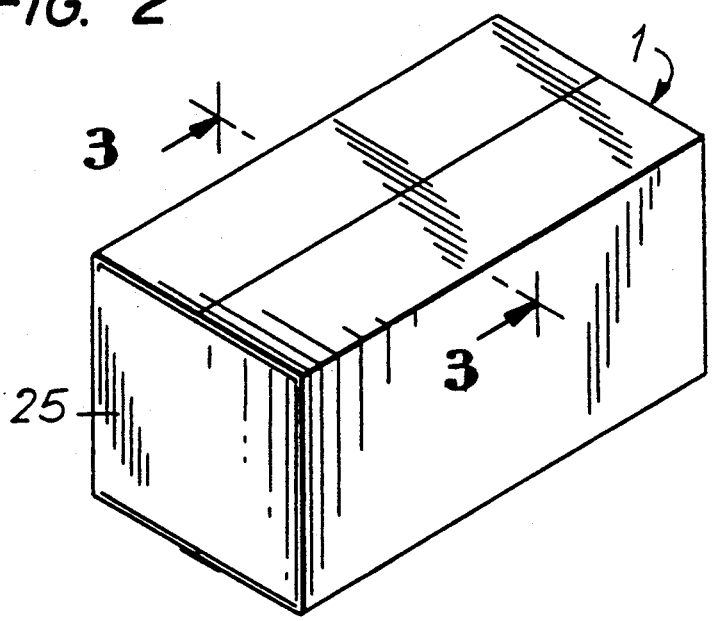
FIG. 2 is an assembled perspective view of FIG. 1.
Figure 3:
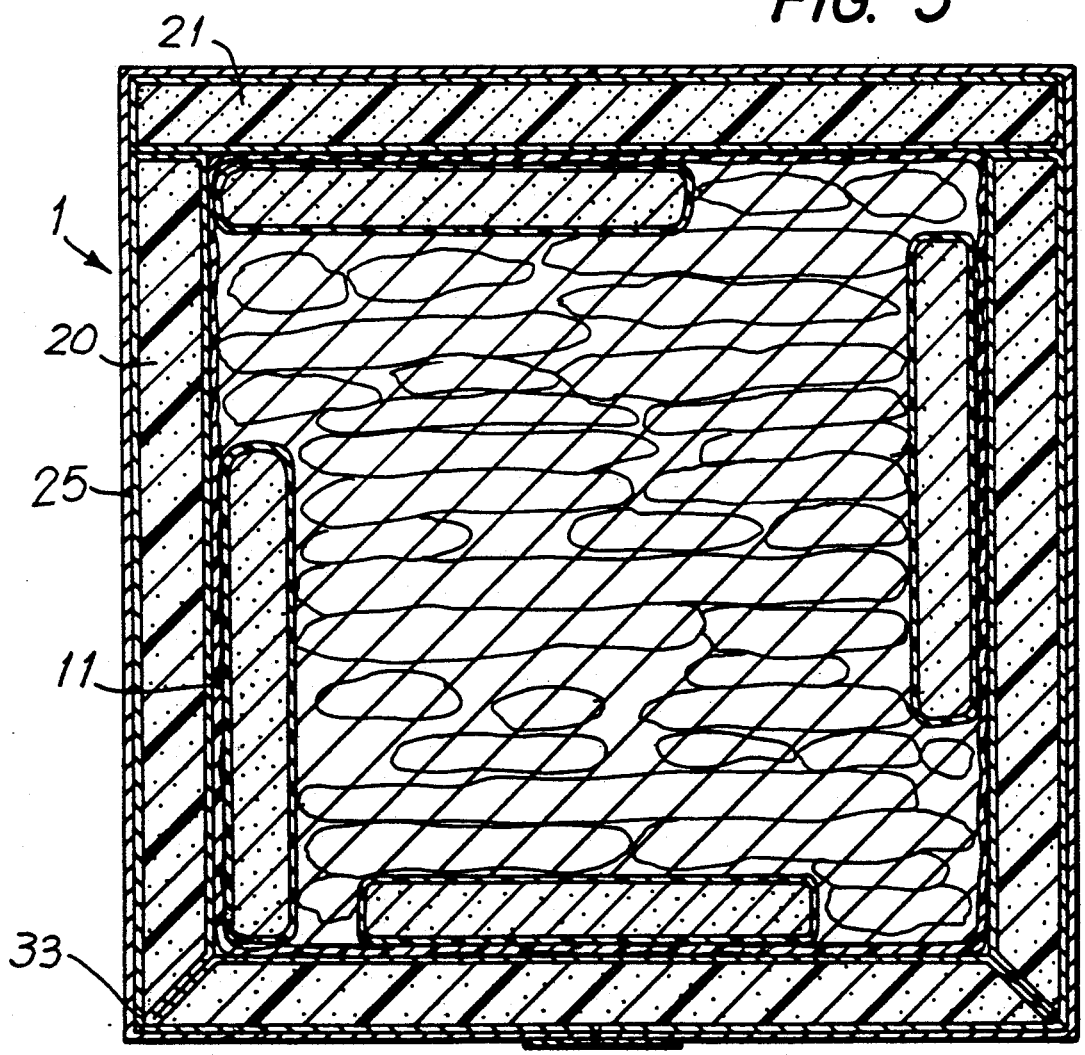
FIG. 3 is a sectional view along the lines 3—3 of FIG. 2.

FIGS. 2 and 3 show the fully assembled package in the corrugated RSC container 25 in perspective an sectional views.

Figure 4:
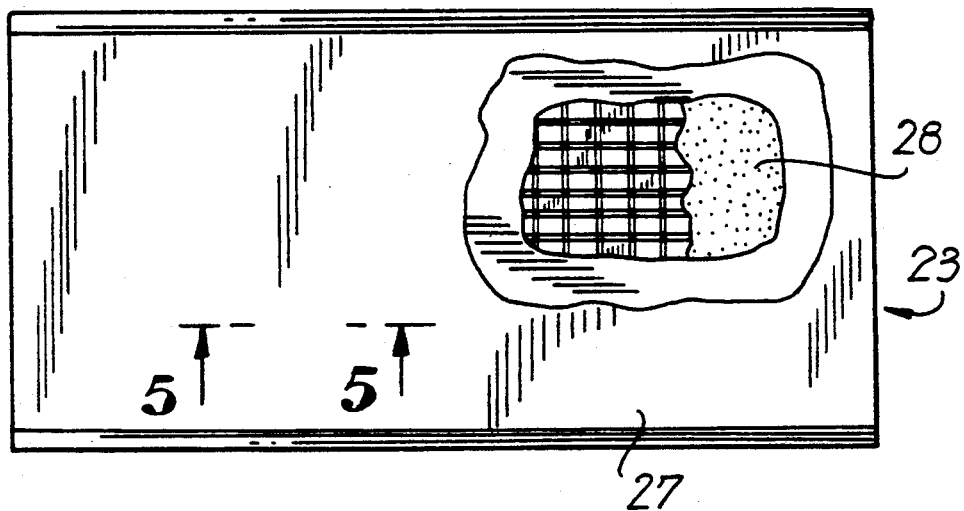
FIG. 4 is a plan view of a panel of the present invention showing a partial cutaway view.

FIG. 4 shows a panel 23 of one of the three portions 20, 21 and 22 of the chill box 30. The panel has foils 27 on its upper and lower surfaces and a honeycomb type material 28 sandwiched inbetween.

Each of the foils 27 is manufactured as a single sheet having an outer coating of polyethylene 34 and an aluminum foil 35 underneath that and on the other side of that a poly-propylene webbing or mesh 36 which is covered by a coating of polyethylene 34.

Figure 5:
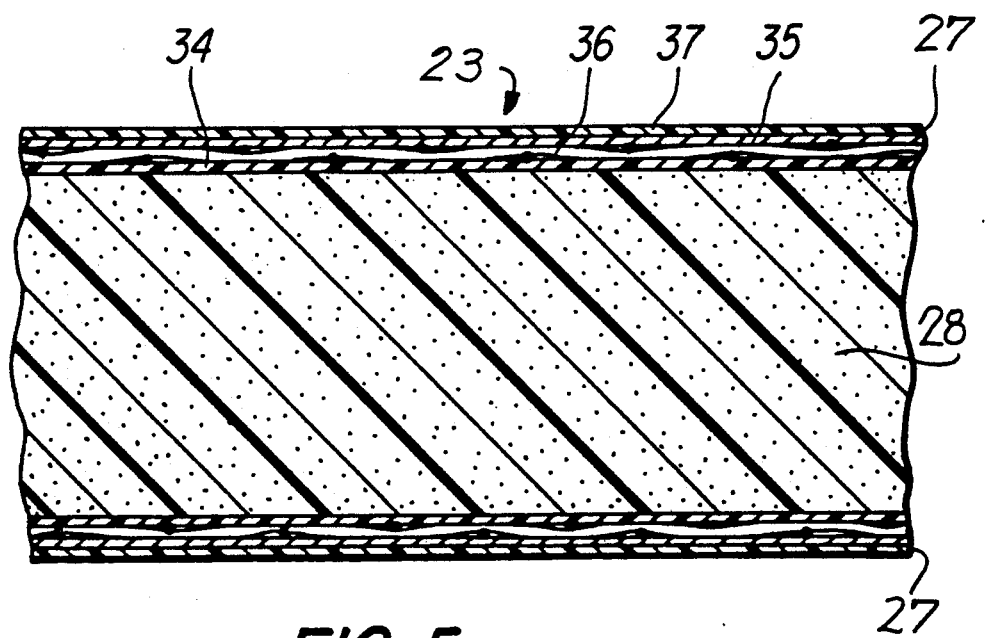
FIG. 5 is a sectional view along the lines 513 5 of FIG. 4.

(See FIG. 5)

The basic configuration of materials in the foil insulation shown in FIGS. 4 and 5 preferably consist of:

2 outer layers of low emissivity aluminum foil reinforced by polypropylene webbing and laminated
with polyethylene film.

321b low density "open cell" polymeric isocyanate foam 28.

The honeycomb material is then applied between the 2 layers of foil. The result is a 1" honeycombed air space between the 2 layers of foil.

The foil 27 is commercially available and produced by several manufacturers, such as FOIL-FLEX, which is marketed by Energy Saver Imports, Inc. in Broomfield, Colo. It does not matter whether or not the side of the foil with the webbing on it faces the polyurethane foam surface. The cut away view of FIG. 4 illustrates the layers of foil 27.

Each of the portions, 20, 21 and 22 have 45 degree chambers in each of the adjoining sides of the chamfers corners to facilitate folding about fold lines 33 as shown in FIG. 1.

Thus the present invention provides a collapsible foldable means for providing insulation which is an improvement in insulation by approximately a factor of 2 over that in the aforementioned art.

Figure 6:
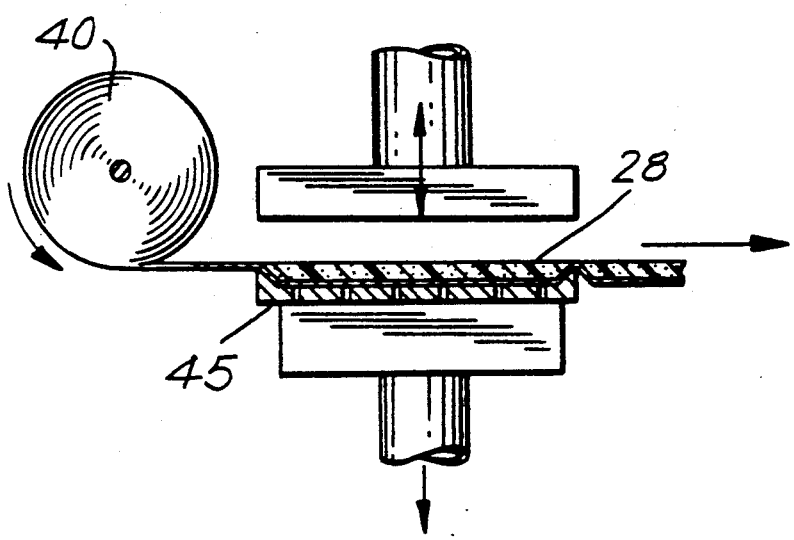
FIG. 6 shows a design view of the pocket forming fibers and insertion of honeycomb.

FIG. 6 illustrates the method of manufacturing the chill box 30 in accordance with the teachings of the invention.

Foil 27 can be dispensed by a roller 40 onto a vacuum mold 45 where it is pulled down flatly onto the plane of the mold 45 by suction. Honeycomb material 28 is applied on top of the foil 27.

Honeycomb material can be obtained from the International Honeycomb Corporation, University Park, Illinois. Honeycomb material is made from kraft paper sheets and has a grid of hexagonal cells which when bonded between two kraft paper sheets provides for a highly crush resistant structure due to the evenly spaced, perpendicularly disposed rigid walls of each honeycomb cell. Alternatively, any other type of material having a lattice structure and/or geometrically patterned structure which provides enhanced strength for supporting and protecting heavy loads of produce and which creates air space as a result of that structure can be used. The air space formed between the kraft layers created an enhanced insulating effect in conjunction with the layers of foil laminated to both sides of the kraft paper. The significance of the air space is that air is a poor conductor of heat and thus has valuable insulation properties in such packaging applications as evidenced by applicants' copending patent applications Ser. No. 203,943 filed on Jun. 8, 1988 and Ser. No. 266,017 filed on Mar. 2, 1988.

An operator working at a second station is operating an automatic cutter and crimper (not shown) would cut and seal the panel at the edges.

Bonding may be accomplished by known conventional means such as by gluing or by pressure sensitive masking. The kraft paper helps to strengthen the insulating material by placing it perpendicular to the rigid honeycomb core walls, thereby ensuring an even distribution of weight over the honeycomb structure. In addition to the air pocket created by the honey comb it provides superior structural integrity to such oversized containers as palletized freight as well as better thermal insulation for the packaged product. Further, the low emissivity, high grade reflectivity of the aluminum foil increases the thermal insulative attributes of the package 1 as was noted in the aforementioned patent application Ser. No. 203,943.

Thus the properties of the combination of aluminum and air insulating material greatly increases the insulation of goods packaged within package 1 while still providing a low weight package which is highly cost efficient for shipping purposes.

Figure 7:
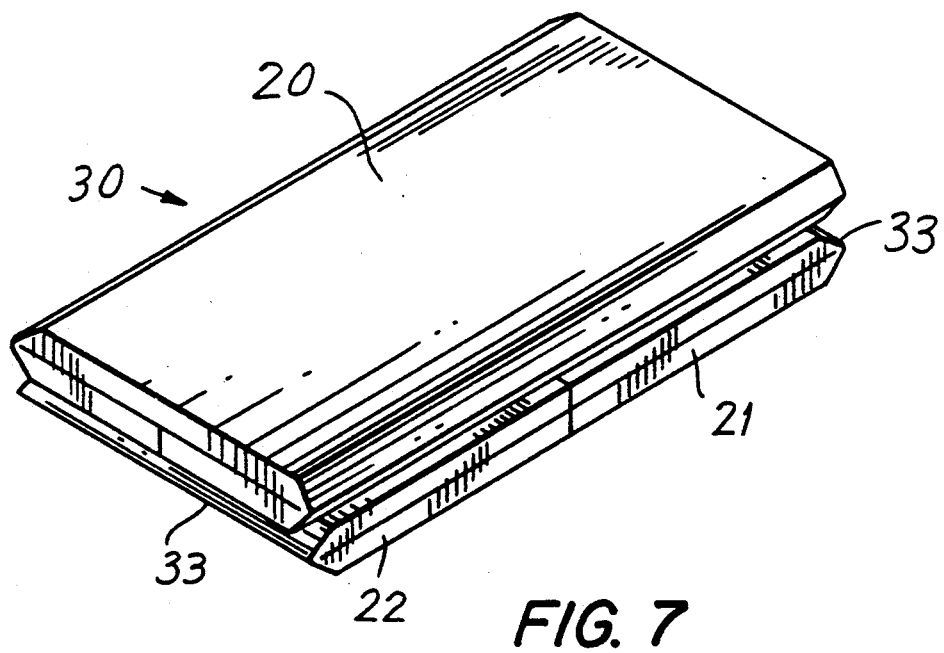
FIG. 7 is a perspective view of the three portions of the present invention folded up.

FIG. 7 shows the completed chill box 30 in folded condition ready for shipping.

We do not limit ourselves to any particular details or constructions set forth in this specification and illustrated in the accompany drawings, as the same refers to and sets forth only certain embodiments of the invention, and it is observed that the same may be modified without departing from the spirit and scope of the invention.

Having thus described the invention, what we claim is new and desire to be secured by Letters Patent is as follows:

1. A chill box adapted to provide insulated packaging for refrigerated goods, comprising:
  a plurality of separate portions, each portion having at least two panels and a bendable corner therebetween, each of said panels having a top, a bottom surface, and edges, and aluminum foil covering at least said top surface, and bottom surface and an insulating material having a geometrically patterned structure to provide air space therein and to strengthen said package disposed therebetween to insulate refrigerated goods packaged within said chill box, each said foil being formed of a first layer of a polyethylene coating, a layer of aluminum and a second layer of polyethylene coating.

2. A chill box according to claim 1 wherein there are three portions; a longitudinal portion having three panels, and two end portions each having two panels, which when assembled form a rectangular shape.

3. A chill box according to claim 1 wherein each bendable corner is chamfered to a 45 angle to facilitate folding.

4. A chill box according to claim 1 wherein said insulating material is formed of honeycomb material to create air space between said foils.

5. A chill box according to claim 1, wherein said insulating material is corrugated material.

6. A chill box according to claim 5, wherein said material is fluted.

7. A chill box according to claim 6, wherein said fluted material has an A flute form.

8. A chill box according to claim 6, wherein said fluted material has a B flute form.

9. A chill box according to claim 6, wherein said fluted material has a C flute form.

10. A package according to claim 6, wherein said fluted material has an E flute form.

11. A chill box adapted to provide insulated packaging for refrigerated goods, comprising:

a plurality of separate portions, each portion having at least two panels and a bendable corner therebetween, each of said panels having a top, a bottom surface, and edges, and aluminum foil covering at least said top surface, and bottom surface and an insulating material having a geometrically patterned structure to provide air space therein and to strengthen said package disposed therebetween to insulate refrigerated goods packaged within said chill box, each said foil being formed of a first layer of a polyethylene coating, a layer of aluminum, a layer of mesh wire and a second layer of a polyethylene coating.

* * * * *